Aug. 31, 1948.　　　　　E. GIRARD　　　　　2,448,305
BOLT POINTING MACHINE

Filed Oct. 19, 1945　　　　　　　　　　　2 Sheets—Sheet 1

INVENTOR
*Ernest Girard*
BY
*Thomas A. Jenks*
ATTORNEY

Aug. 31, 1948.  E. GIRARD  2,448,305
BOLT POINTING MACHINE
Filed Oct. 19, 1945  2 Sheets-Sheet 2
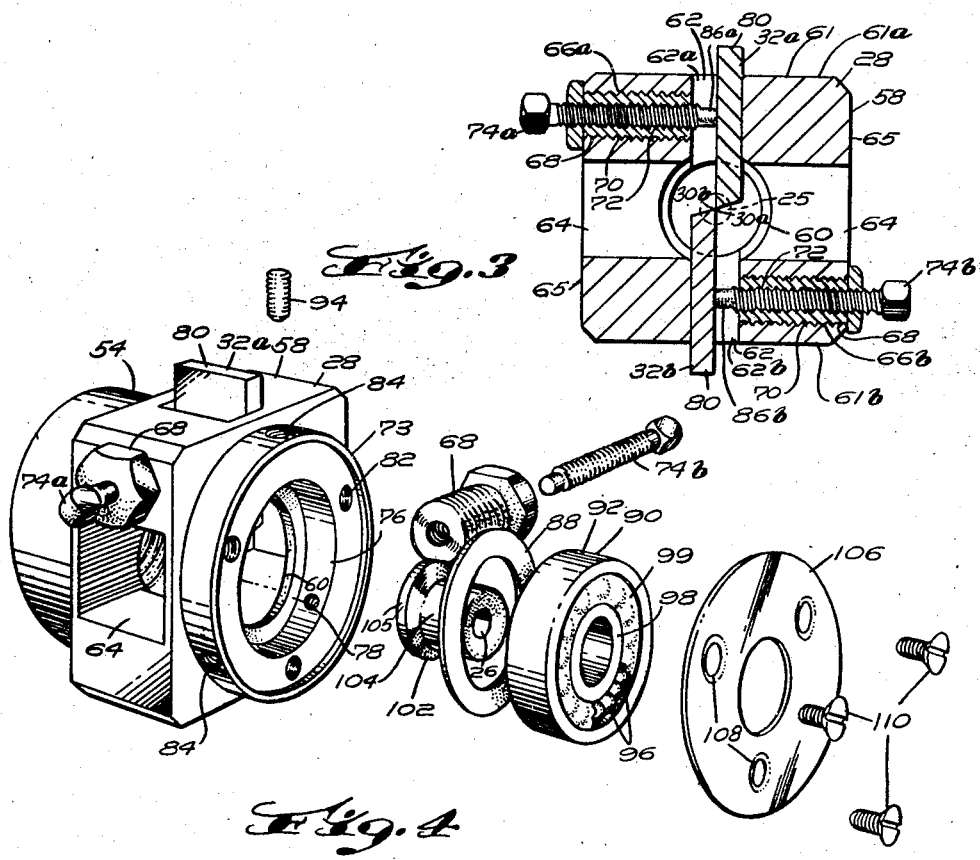
Fig. 3
Fig. 4
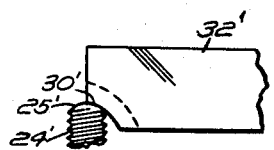
Fig. 5
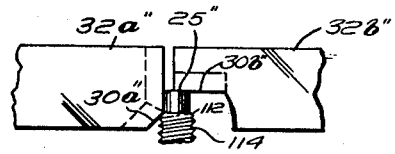
Fig. 6
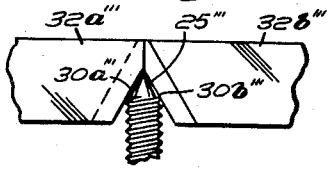
Fig. 7
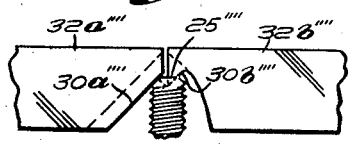
Fig. 8
INVENTOR
Ernest Girard
BY
Thomas A. Jenckes
ATTORNEY Patented Aug. 31, 1948

2,448,305

UNITED STATES PATENT OFFICE 2,448,305

BOLT POINTING MACHINE

Ernest Girard, Central Falls, R. I., assignor, by direct and mesne assignments, to American Tool Head Corporation, Providence, R. I., a corporation Application October 19, 1945, Serial No. 623,313

12 Claims. (Cl. 10—21)

My invention relates to improvements in high speed pointing machines particularly adapted for pointing bolts. While bolts may be pointed on a lathe by advancing the rotating bolt into a stationary holder and I am aware that others have provided ball or other types of anti-friction bearings for use in such a stationary holder, it has been discovered that the production of bolts can be greatly increased if the time necessary to start and stop rotation of each individual bolt is lessened by successively advancing stationary bolts through a continuously rapidly rotating tool holder. This has been done in the art for many years, but to support the bolts the inner end of the tool holder has been provided with a standard type of bearing or bushing. Also in the prior art only one cutting tool has been employed to rotate with the rotating tool holder. One tool therefore has tended to wear the bearing which rotates evenly therewith diametrically opposite its point of application on the stationary bolt and these bushings have tended to wear out very quickly, the longest length of life thereof in use being for the production of about 25,000 screws.

Anti-friction bearings, roller, ball, or otherwise have been used so far as I am aware in the prior art between a stationary bearing and a rotating spindle just as they have been used in the prior art in pointing bolts to support a rotating bolt while it is being cut. So far as I am aware no one in the prior art in bolt pointing machines or otherwise has visualized that if a ball bearing were used as a bushing or bearing between a rotating member and a stationary spindle or bolt, that the wear on the contacting portion of the bushing and the bolt or spindle would be reduced to such a substantial minimum that the life of the bearing would be greatly increased and the quality of the cutting work on the points of the bolts would be greatly improved, thereby producing new and unexpected results by the substitution of a ball or other type of anti-friction bearing for a standard bearing on the rotating tool holder. The friction or wear on the prior art bearings has been great. The high speed at which the tool and bearing rotate has tended to create so much friction as to heat up the bearing and roughen up the surface of the metal on the bolt so as to prevent the use of these desirable high speed bolt pointing machines on any bolts having a threaded or other cut surface and the speed of the machines has had to be so reduced as to substantially slow up production. With the use of my invention, the friction between the end of the bolt supported by the bearing close to the cutting tool means and the bearing is so reduced that substantially no heat is produced, thereby permitting the cutting of a smoother point on the bolt and preventing the marring of the threads on or near the outer surface of the bolt adjacent the cutting tool in any way.

Employing my invention, I have found that the friction is so reduced that so little heat is generated thereby that the cutting can take place without any lubrication, and that even bolts constructed of hard metals, such as Monel metal, stainless steel, chrome nickel, etc., which normally need much lubrication while pointing, can be readily pointed on my invention without any lubrication at all. In addition, I have found in practice that the wear on the inner portion of the bearing, whether it comprises a separate bushing contained within the inner raceway of the ball or anti-friction bearing or the inner raceway itself, is so reduced that my improved anti-friction bearings can be so employed over a remarkably greater period. In fact, one has been used on a machine which has already made 800,000 bolts without any substantial amount of wear, another unexpected result.

A further object of my invention is to provide a better cushion between the bolt and cutting tool provided by the structure of the anti-friction roller or ball bearing itself and a more flexible guide due to such construction for guiding the end of the bolt to be used into proper relationship with the cutting edge of the cutting tool.

Observing my invention in use, it is apparent that the inner raceway does not rotate as fast as the tool and outer raceway and that when the bolt is forcibly advanced within the tool holder so that its end to be pointed is brought into cutting relationship with the cutting edges of the cutting tools, that the inner raceway is practically brought to a stationary condition while this pressure is so applied to the bolt thus permitting substantially no rotation of the bearing surface of the bushing or inner raceway immediately adjacent the bolt so that there is no friction of a rotating member immediately adjacent the surfaces of the bolt so that its outer surface even if threaded will receive substantially no wear, thus permitting my invention to be used for pointing threaded bolts, a feature not possible in prior art structures and a new unexpected result from the use of a roller or ball anti-friction bearing in this relationship.

A further object of my invention is to so reduce the friction between the bolt and bearing that the pointing tools themselves last a longer period of time.

A further feature of my invention is that I may provide a plurality of cutting tools. If two are employed and employed diametrically opposite each other, it is obvious that the internal radial pressure each exerts on the bearing tends to balance that exerted by the other and the wear on the bearing is not opposite a single point the way it is if a single tool be employed. If only a single tool be employed, however, the wear is not as great as it is distributed around the anti-friction elements of the anti-friction bearing and the inner race thereof which revolves at a different speed from the outer race. If more than two tools are employed it is obvious that they tend to balance their radial thrusts which are more evenly distributed throughout the anti-friction bearing. It is apparent that the cutting efficiency with the use of two or more tools is greatly increased enabling the production to be increased as the cutting takes place with two tools substantially twice as fast as with one tool.

A further object of my invention, due to lack of friction and heat and the fact that there is no real revolution of the bearing member immediately adjacent the bolt, is that I am able to cut any type of fancy point on a bolt and even on bolts that have been prethreaded. Thus I may cut a rounded or oval end point on a bolt, a dog point, a cone point, a cup point and other fancy types of points on bolts whether previously threaded or not prior to being pointed, the fancy points being more readily cut with a plurality of tools, thereby greatly enlarging the scope of use of the standard type of a pointing machine and permitting it to produce difficult points which could only be produced in the prior art by passage through additional machines, such as milling machines, with the extra slowdown in production and extra cost.

A further object of my invention relates to the structure of the means I employ to detachably secure the cutting tool means within the rotating head which preferably includes a detachable socket for the clamping bolt for the tool means which takes up all the wear of adjustment and consequently lengthens the life of the tool holder as the threads thereof are not worn down by adjustments or selective replacements of tools.

Further features of my invention relates to the specific structure of my improved tool holder which is particularly designed to shut off even an open ball bearing from the area in which the cutting detritus is formed and from the dust and dirt of the atmosphere in the shop where it is used.

These and such other objects of my invention as may hereinafter appear will be best understood from a description of an embodiment thereof, such as is shown in the accompanying drawings.

In the drawings, Fig. 1 is a front elevation of a bolt pointing machine employing my invention, prior to the insertion of the end of the bolt to be pointed within the pointing head or tool holder.

Fig. 3 is a cross sectional view taken through the tool holder along the line 3—3 of Fig. 2.

Fig. 4 is an exploded perspective view of the parts of the tool holder.

Figure 1:
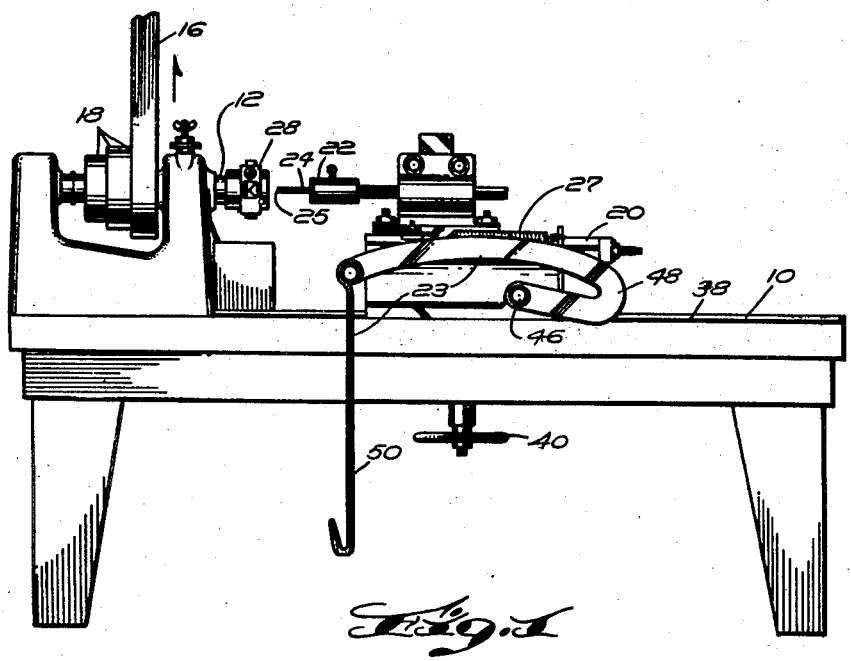

Figs. 5 to 8 are diagrammatic front elevations showing different cutting tools and bolt points, diagrammatically illustrating how suitable tools may be employed to cut novel or fancy points with my invention, Fig. 5 showing a cutting tool having a cutting edge rounded to form a rounded or oval head on a bolt, Fig. 6 showing a plurality of tools formed to cut a dog point on a bolt, Fig. 7 illustrating two tools having cutting edges so shaped as to cut a cone point and Fig. 8 showing two tools having cutting edges so shaped as to form a cup point.

In the drawings, wherein like characters of reference generally indicate like parts throughout, 10 generally indicates a standard type of bolt pointing machine. Said standard type of machine has the usual spindle 12 and in the preferred embodiment shown has an externally threaded and preferably reduced inner end 14. Means are provided to continuously rotate said spindle, in the embodiment shown, comprising a belt 16 driving a pulley 18 on the spindle 12, in the embodiment shown for speed changing purposes one of a set of pulleys 18 of different diameter. Said machines are also provided with a slide 20 having a non-rotatable bolt holder 22 on the end thereof in alignment with the spindle 12 and suitable means 23 for advancing and retracting the slide 20, bolt holder 22, and a bolt 24 contained within the said bolt holder, at will so that the point 25 of the non-rotatable bolt may be advanced from a retracted position as shown in Fig. 1 to the advanced position shown in Fig. 2 to be inserted through the bearing orifice 26 of the rotatable tool holder 28 mounted on the inner end of the rotating spindle 12 to rotate therewith, in aligned relationship to the cutting edge 30 of the rotating tool 32 suitably mounted in said tool holder 28 to rotate therewith.

As stated hitherto, so much of the apparatus hitherto described is old in bolt pointing machines. A standard type of tool holder formerly employed therein has means in its outer portion 54 for detachable securement to the spindle 12, a center tool holding portion 58 and a bearing containing portion 73 at its inner end for containing a standard type of bearing having a center orifice 26 for admitting the point 25 within said center portion 58 in cutting relationship to the cutting edge 30 of the pointing tool 32. I have shown in the drawings a standard type of means 23 for advancing the slide 20, bolt holder 22 and bolt 24 into such cutting relationship. The slide 20 is slidably mounted on a runway 34 having a base 36 which may be clamped in a selected position on the machine base 38 by the clamp 40. The slide 20 slides on suitable runways 34 formed on the upper portion of its base. The slide 20 has a rack 42 on its lower surface in mesh with the pinion segment 44 mounted on the rotatable shaft 46 extending transversely of the machine immediately below the rack 42. The end of the shaft 46 has mounted thereon the bent arm 48 which has the foot treadle 50 pivotally mounted on the free end thereof. It is apparent that on depression of the foot treadle 50, the pinion 44 rotates the rack 42 to advance the slide 20, bolt holder 22 and attached bolt 24 to insert the point 25 thereof through the orifice 26 in the bearing. As diagrammatically illustrated in the drawings but not described, various means are provided for adjusting the relationship of the slide 20 to the spindle 12 and the relationship of the bolt holder 22 to the slide 20 which varies with the length of the bolts. The bolt holder 22 may be provided with an adapter for selectively holding different shaped or sized heads of bolts for insertion within the orifice 26 in the pointing head 28. In the prior art as the bearings or bushings having the orifices 26, due to their inherent structure and the fact that as they continuously rotated with the spindle were in continuous frictional contact with the bolts 24 and as in the prior art only a single cutting tool 32 was employed tending always to exert a radial thrust on the bushing in the same direction, said bushings or bearings tended to wear out very quickly, usually after pointing about 25,000 bolts and due to the frictional contact of the surface of the orifice 26 with the rotating bolt, irregularities in the outer surface of the bolt through heat and friction were formed and it was impossible to point pre-threaded bolts on such pointing machines.

Figure 2:
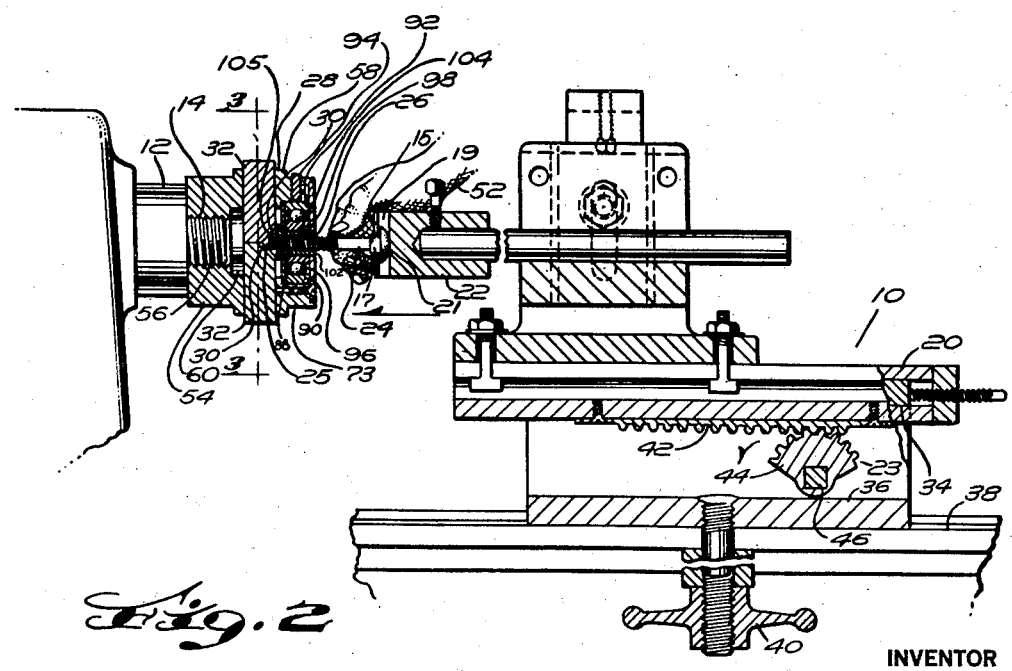
Fig. 2 is a diagrammatic vertical sectional view partially shown in elevation of the spindle, rotating tool holder, bolt holder and slide of the pointing machine shown in Fig. 1 after the bolt has been advanced to cutting position within the tool holder.

Thus, in practice the hand 52 would grasp a bolt, insert the head 21 thereof laterally through the slot 19 in the holder 22 so that the non-circular portion 17 thereof would lie in a cooperatingly shaped hole 15 in the adapter portion of the bolt holder 22 to permit the selective non-rotatable mounting of the bolt 24 within the bolt holder and in practice as the slide 20 was advanced by depression of the foot treadle in the manner explained, the hand 52 guided the point 25 of the bolt 24 through the orifice 26 in the bearing to bring it in cutting relationship with cutting edge 30 of the cutting tool and as the slide 20 became retracted by the spring 27, the slide 20, bolt holder 22 and bolt 24 were withdrawn to the retracted position shown in Fig. 1 for the rapid selective insertion of another bolt within the bolt holder 22 for the repetition of the pointing operation on a new bolt, much faster than any prior art structure employing a stationary tool and a rotating bolt could operate, for with the type of machine shown, it is unnecessary to stop rotation of the bolt holder for selectively replacing a bolt with another bolt and again rotating it at a proper speed prior to insertion of the rotating bolt within a stationary bolt holder when rotating at proper speed for the pointing thereof. In practice I have found that employing my invention the bolt 24 is provided with substantially the finished point by the time the bolt is completely inserted in cutting relationship with the cutting tool 32 on continued depression of the foot treadle 50 until the proper point is formed with the pointing thereby taking place very rapidly and when my invention is employed with the inner race or bushing being substantially stationary during the cutting or pointing operation.

As stated hitherto, my invention relates to the provision of a novel type of rotatable tool holder to be mounted on the rotating spindle 12 in combination with the other elements of a bolt pointing machine hitherto described. In the effort to increase the efficiency of such bolt pointing machines to enable them to point a larger number of different types of points impossible in the prior art without two or three operations, and to increase the life of the bearing I visualized that if an anti-friction bearing such as a ball bearing be used inside out as compared to its former uses in supporting a rotating spindle, namely with its outer race mounted in the base of a rotating tool holder to rotate therewith and its inner race or contained bushing mounted adjacent an insertable non-rotatable bolt, that in use the inner race would not rotate at all, thereby causing no friction or heat between said inner race and/or bushing and bolt, thus reducing the wear on the bushing and substantially eliminating all friction against the inserted bolt. So far as I am aware, I am the first to use a bearing having rotatable anti-friction elements for this purpose mounted in a rapidly rotating tool holder, containing tool means to rotate therewith functioning against the point of a stationary bolt but in which the inner race or bushing thereof functions in the prior art desirable manner of supporting the end of the bolt to be pointed immediately adjacent the cutting tool 32 and then I designed a tool holder for use in this relationship of a structure to be described. In the specific embodiment shown, said tool holder is specifically constructed as follows:

Said tool holder 28 is provided with a preferably cylindrical outer portion 54 provided with means for detachable securement to the inner end of rotating spindle 12, in the embodiment shown, comprising the internally threaded bore 56 for threaded engagement on the threaded projection 14 from the inner end of the spindle 12, and a center tool holding portion 58 having means for detachably securing a selected pointing tool therein so that the cutting edge thereof may be adjacent and in cutting relationship to the point 25 of the bolt 24. In the embodiment shown, the center portion 58 is preferably substantially square and is provided with the internal bore 60 and where my invention is employed to receive a plurality of pointing tools, with radial tool holding slots 62 preferably the two slots 62a and 62b in diametrically opposed relationship, extending through diametrically opposed sides 61 thereof to said bore 60 and detritus ejecting and air cooling slots 64 projecting from said bore 60 through the intermediate opposite sides 65. Said intermediate sides 65 are also provided with the bolt receiving holes 66a and 66b extending through the diametrically opposed sides 61a and 61b having the tool holding slots 62a and 62b therein extending from the outer surfaces of said intermediate sides 65 to said radial slots 62a and 62b, said holes 66a and 66b being thus exterior of said bore 60 and normal to the tool slots 62a and 62b.

In order to increase the life of my tool holder, as shown in the drawings, in my preferred embodiment I preferably employ a novel type of hollow bolt socket 68 adapted to fit within the respective threaded portions of the respective holes 66a and 66b externally threaded as at 70 to fit in said holes and internally threaded as at 72 to receive the tool clamping bolts 74a and 74b.

Said tool holding head 28 is also provided with an inner preferably substantially cylindrical bearing holding portion 73 having a bore 76 of larger size than that of said center portion providing a shoulder 78 of substantial radial thickness at the outer end thereof. The replaceable pointing tools 32a and 32b thus project inwardly of said radial slots 62a and 62b in said center portion 58 and have ends 80 exterior of said center portion 58 and pointing or cutting edges 30a and 30b terminating near the center of said head in cutting relationship with the flat point 25 of the bolt 24 as shown in Fig. 3. Said inner bearing holding portion 73 may also be provided with the axially extending screw holes 82 on the outer surface thereof and the radial set screw holes 84 extending from the periphery thereof to the bore 76 thereof. The tool clamping bolts 74a and 74b are threaded within the bolt socket holes 72 and are provided with the respective points 86a and 86b extending within the respective tool holding slots 62a and 62b to abut one side of the tool 32a and 32b to clamp its opposite side against the opposite side of its respective slot 62a and 62b. For a purpose to be described, I may provide a washer 88 abutting the shoulder 78 in the outer end of said inner head portion 73.

As stated, however, a main feature of my invention is to employ an anti-friction bearing, preferably a ball bearing 90 having its outer race 92 non-rotatably mounted in the inner bearing holder portion 73, the rotating tool holding head 28 abutting said washer 88 where employed and secured against rotation within said inner bearing containing portion 73 of the head preferably by having the set screws 94 inserted within the screw holes 84 abut the outer surface thereof and non-rotatably clamp it therein. Said ball bearing 90 also comprises the balls 96 separating the outer raceway 92 from the inner raceway 98. While I preferably employ a ball bearing 90, a roller bearing or any other type of anti-friction bearing may be employed, but in general I have found ball bearings superior to roller bearings, both in their guiding and cushioning functions. In the embodiment shown, I have provided a bushing 102 having an external surface 104 fitting closely within the inner raceway 98 and a circumferential annular lip 105 projecting radially outwardly at the outer end thereof retained in position within the inner raceway 98 by the edges of the cutting tools 32a and 32b abutting said lip 105 and an internal bolt receiving orifice 26 similar to the orifice 26 of the standard type of prior art bearing to guide the bolt into proper axial alignment with the cutting ends 30 of the pointing tools 32a and 32b. With this construction it is obvious that the balls 96 or other anti-friction elements of the ball or other anti-friction bearing may be protected from the detritus formed by the cutting tools by making the internal bore 60 of much smaller size than the bore 76 of the outer portion 73 so as to provide a shoulder 78 of sufficient radial thickness to cover the balls 96 or other anti-friction elements as well as the outer surface of the outer race 92. If the washer 88 be employed even if the shoulder is not of such a thickness, it may be made of such a greater radial thickness as to function for this purpose. If desired, however, the anti-friction bearing may be made with the usual covers 99 on each side thereof to protect the balls or other anti-friction elements from the entrance of detritus from their inner or outer surfaces. To protect the anti-friction bearing from the atmosphere in the tool room, I may provide the cover 106 therefor provided with suitable screw holes 108 so that the screws 110 may be inserted through said screw holes 108 and axial screw holes 82 in said outer head portion 73 to secure the bearing cover 106 on the inner end of said bearing portion 73. Any other suitable means may be employed than the set screws 94 shown for non-rotatably mounting the outer race 92 within the bore 76 of said inner portion 73. During the war emergency I have employed the supplemental bushings 102 due to the fact that it has been impossible to buy ball or anti-friction bearings having hard wear-resistant inner races, although if such a bearing inner race be employed the bushing 102 may be omitted. If desired the washer 88, shoulder 76 and/or cover 106 may be omitted.

Where I have hitherto in use employed my improved ball or anti-friction bearing structure, particularly when pressure is applied to insert the end 25 of the bolt 24 to be pointed within the orifice 26 to bring its point 25 in cutting relationship with the cutting edges 30a and 30b of the cutting tools, I have noticed that the inner race 98 and bushing 102 substantially cease to revolve, thereby providing no wear on the bearing or bushing portion 98 or 102 in contact with the inserted bolt 24 so that no heat or friction may be developed at this point to impair the outer surface of the bolt, even permitting the pointing of threaded bolts. This structure greatly increases the life of the bearing and a pointing machine equipped with my invention has been employed to point over 800,000 bolts as against the 25,000 limit of prior art pointing machine bearings and still shows no wear.

While in my preferred embodiment I have shown two cutting tools 32a and 32b which tend to balance the inward radial stress or thrust of the rotating tool holder, and tools exerted against the balls 96, the ball race 98, and/or bushing 102 where employed and bolt 24, it is obvious that this thrust is so evenly distributed circumferentially over said balls 96 or other anti-friction elements, inner race 98 and bushing 102 where employed that there will be substantially no tendency for the inner bearing member, whether it comprises the race 98 or bushing 102, to wear diametrically opposite a single pointing tool.

I have diagrammatically illustrated in Figs. 5 to 8 various types of cutting tools which may be employed to cut different types of points 25 on the bolts 24. When employing a standard flat point, it is obvious that the outer edge of the cutting tool may be shaped to shave the outer end 25 of such a bolt flat as suggested in dotted lines in Fig. 3. I have shown in Fig. 5 a tool 32' having a cutting edge 30' rounded to form a rounded or oval point 25' on the threaded bolt 24', shown therein. I have shown in Fig. 6 my invention employed to cut a dog point 25'' with one tool 32a'' having a cutting edge 30a'' shaped to reduce the diameter of the bolt and provide it with a smooth surface of less than that of the bolt threaded diameter and to form a tapered edge 112 on the end of the threaded portion 114 and the other tool 32b'' having a cutting edge 30b'' shaped to smooth the end of the bolt to provide the flat point thereon. I have shown in Fig. 7 two tools 32a''' and 32b''' having tapered cutting edges 30a''' and 30b''' so shaped as to cut a cone point 25'''. I have shown in Fig. 8 two tools 32a'''' and 32b'''' having cutting edges 30a'''' and 30b'''' shaped to cut a cup point on the bolt, one tool having an inclined or tapered shaving surface 30a'''' for frusto-coning the point 25'''' and the other tool having a cup cutting surface 30b'''' for hollowing out or cupping the end of the point as shown. As stated, it has been impossible in the prior art to point threaded bolts on this standard type of bolt pointing machine alone in a single operation. It has also been impossible in the prior art to successfully cut dog points as shown in Fig. 6 or cup points as shown in Fig. 8 on bolts especially if these bolts have been previously threaded as shown. While I have illustrated different types of fancy points in Figs. 5 to 8 which may be formed on bolts with my invention, it is apparent that other types of fancy points may be so formed.

I employ the word "anti-friction bearing" in the claims, to define a bearing having an inner annular bearing raceway, an outer annular bearing raceway rotatable relative thereto, and rotatable anti-friction elements such as balls or rollers interposed between said raceways.

It is apparent therefore that I have provided a novel type of bolt pointing machine with the advantages described above.

It is understood that my invention is not limited to the specific embodiment shown and that various deviations may be made therefrom without departing from the spirit and scope of the appended claims.

What I claim is:

1. In a bolt pointing machine, a spindle having an externally threaded inner end, means torque connected to the spindle to rotate said spindle, a slide having a non-rotatable bolt holder on the end thereof in alignment with said spindle, a tool holding head having a cylindrical internally threaded outer portion rigidly mounted on the threaded end of the spindle, a substantially square center portion having an internal bore, diametrically opposite radial tool holding slots and bolt receiving holes exterior of said bore normal to said tool slots, hollow bolt sockets externally threaded to fit in said holes and internally threaded to receive tool clamping bolts and an inner substantially cylindrical bearing holding portion having spaced axial screw holes in the inner end thereof and a bore of larger size than that of said center portion forming a shoulder at the outer end thereof, replaceable pointing tools projecting inwardly of said radial slots in said center portion having ends exterior of said center portion and pointing edges terminating near the center of said head, tool clamping bolts threaded within said bolt socket holes, each having a point extending within a tool holding slot to abut one side of a tool to clamp its opposite side against the opposite side of said slot, a washer abutting the shoulder in the outer end of said inner head portion, an anti-friction bearing having its outer raceway abutting said washer secured against rotation within said inner bearing containing portion of the head, a bushing having an external surface fitting closely within the inner raceway and a circumferential lip projecting radially outwardly at the outer end thereof retained in position by the pointing tools, and an internal bolt receiving orifice to guide the bolt into proper axial alignment with the cutting ends of the pointing tools, a cover for the inner end of said head bearing portion having screw holes, screws fitting within said screw holes in the cover and head for holding said outer anti-friction bearing raceway and washer against said shoulder and means connected to said slide for advancing and retracting said slide, bolt holder and contained bolt at will so that the point of the non-rotating bolt is inserted through the bushing orifice in the head in aligned relationship to the cutting edges of the rotating tools.

2. In a bolt pointing machine, a spindle, means torque connected to the spindle to rotate said spindle, a slide having a non-rotatable bolt holder on the end thereof in alignment with said spindle, a tool holding head having an outer portion rigidly mounted on the end of the spindle, a substantially square center portion having an internal bore, diametrically opposite radial tool holding slots and bolt receiving holes exterior of said bore normal to said tool slots, and an inner bearing holding portion having a bore of larger size than that of said center portion forming a shoulder at the outer end thereof, replaceable pointing tools projecting inwardly of said radial slots in said center portion having pointing edges terminating near the center of said head, tool clamping bolts threaded within said bolt holes, each having a point extending within a tool holding slot to abut one side of a tool to clamp its opposite side against the opposite side of said slot, an anti-friction bearing having its outer raceway abutting said shoulder secured against rotation within said inner bearing containing portion of the head, a bushing having an external surface fitting closely within the inner raceway and a circumferential lip projecting radially outwardly at the outer end thereof retained in position by the pointing tools, and an internal bolt receiving orifice to guide the bolts into proper axial alignment with the cutting ends of the pointing tools, and means connected to said slide for advancing and retracting said slide, bolt holder and contained bolt at will so that the point of the non-rotating bolt is inserted through the bushing orifice in the head in aligned relationship to the cutting edges of the rotating tools.

3. In a bolt pointing machine, a spindle, means torque connected to the spindle to rotate said spindle, a slide having a non-rotatable bolt holder on the end thereof in alignment with said spindle, a tool holding head having an outer portion rigidly mounted on the end of the spindle, a center portion having an internal bore, a radial tool holding slot and a bolt receiving hole exterior of said bore normal to said tool slot, a hollow bolt socket externally threaded to fit in said hole and internally threaded to receive a tool clamping bolt and an inner bearing holding portion having a bore of larger size than that of said center portion forming a shoulder at the outer end thereof, a replaceable pointing tool projecting inwardly of said radial slot in said center portion having a pointing edge terminating near the center of said head, a tool clamping bolt threaded within said bolt socket hole, having a point extending within said tool holding slot to abut one side of the tool to clamp its opposite side against the opposite side of said slot, an anti-friction bearing having its outer raceway abutting said shoulder secured against rotation within said inner bearing containing portion of the head, a bushing having an external surface fitting closely within the inner raceway and a circumferential lip projecting radially outwardly at the outer end thereof retained in position by the pointing tool, and an internal bolt receiving orifice to guide the bolts into proper axial alignment with the cutting end of the pointing tool, and means connected to said slide for advancing and retracting said slide, bolt holder and contained bolt at will so that the point of the non-rotating bolt is inserted through the bushing orifice in the head in aligned relationship to the cutting edge of the rotating tool.

4. In a bolt pointing machine, a spindle, means torque connected to the spindle to rotate said spindle, a slide having a non-rotatable bolt holder on the end thereof in alignment with said spindle, a tool holding head having an outer portion rigidly mounted on the end of the spindle, a center portion having an internal bore, a radial tool holding slot and a bolt receiving hole exterior of said bore normal to said tool slot, and an inner bearing holding portion having a bore of larger size than that of said center portion forming a shoulder at the outer end thereof, a replaceable pointing tool projecting inwardly of said radial slot in said center portion having a pointing edge terminating near the center of said head, a tool clamping bolt threaded within said bolt hole, having a point extending within said tool holding slot to abut one side of a tool to clamp its opposite side against the opposite side of said slot, an anti-friction bearing having its outer raceway abutting said shoulder secured against rotation within said inner bearing containing portion of the head, a bushing having an external surface fitting closely within the inner raceway and a circumferential lip projecting radially outwardly at the outer end thereof retained in position by the pointing tool, and an internal bolt receiving orifice to guide the bolts into proper axial alignment with the cutting end of the pointing tool, and means connected to said slide for advancing and retracting said slide, bolt holder and contained bolt at will so that the point of the non-rotating bolt is inserted through the bushing orifice in the head in aligned relationship to the cutting edge of the rotating tool.

5. In a bolt pointing machine, a spindle, means torque connected to the spindle to rotate said spindle, a slide having non-rotatable bolt holding means on the end thereof in alignment with said spindle, a tool holding head having an outer end having means rigidly mounted on the inner end of the spindle, a hollow center portion having radial tool holding slot means and an inner bearing holding portion having a bore of larger size than the interior of said center portion forming a shoulder at the outer end thereof, replaceable pointing tool means projecting inwardly of said radial slot means in said center portion having pointing edge means terminating near the center of said head, means rigidly securing said tool means within said slot means, an anti-friction bearing having its outer raceway secured against rotation within said inner bearing containing portion of the head, a bushing having an external surface fitting closely within the inner raceway and a circumferential lip projecting radially outwardly at the outer end thereof retained in position by the pointing tool means, and an internal bolt receiving orifice to guide the bolts into proper alignment with the pointing edge means of the pointing tool, and means connected to said slide for advancing and retracting said slide, bolt holder and contained bolt so that the point of the non-rotating bolt is inserted through the bushing orifice in the head in aligned relationship to the rotating pointing tool means.

6. In a bolt pointing machine, a spindle, means torque connected to the spindle to rotate said spindle, a slide having non-rotatable bolt holding means on the end thereof in alignment with said spindle, a tool holding head having an outer end having means rigidly mounted on the inner end of the spindle, a hollow center portion having radial tool holding socket means and an inner hollow bearing holding portion immediately adjacent said tool holding socket means, replaceable pointing tool means projecting inwardly of said tool holding means in said center portion having pointing edge means terminating near the center of said head, a radial anti-friction bearing having an inner raceway and an outer raceway surrounding said inner raceway and having its radially outer raceway secured against rotation within said inner bearing containing portion of the head, a bushing having an external surface fitting closely within the radially inner raceway and secured against axial movement therein and an internal bolt receiving orifice to guide the bolts into proper alignment with the pointing edge means of the pointing tool means, means securing said radially outer bearing raceway within said inner portion and means connected to said slide for advancing and retracting said slide, bolt holding means and contained bolt so that the point of the non-rotating bolt is inserted through the bushing orifice in the head in aligned relationship to the rotating pointing tool means, whereby when the end of the bolt to be pointed contacts the pointing tool means, the bushing holds the bolt in position substantially without any revolution of said bushing to substantially inhibit friction between the contacting surfaces of said bolt and bushing in use.

7. In a bolt pointing machine having a spindle, means torque connected to the spindle to rotate said spindle, a slide having non-rotatable bolt holding means on the end thereof in alignment with said spindle, a tool holding head having an outer end having means rigidly mounted on the inner end of the rotating spindle, a hollow center portion having radial tool holding socket means for receiving replaceable pointing tool means projecting inwardly of said hollow center portion having pointing edge means terminating near the center of said head, and an inner hollow bearing holding portion immediately adjacent said tool holding socket means, a radial anti-friction bearing having an inner raceway and an outer raceway surrounding said inner raceway and having its radially outer raceway secured against rotation within said inner bearing containing portion of the head, and means connected to said slide for advancing and retracting said slide, bolt holding means and contained bolt at will, so that the point of the non-rotating bolt is inserted through the orifice in the radially inner raceway to guide the advancing bolt into proper axial alignment with the pointing edge means of the pointing tool means, whereby when the end of the bolt to be pointed contacts the pointing tool means, the radially inner raceway holds the bolt in position substantially without any revolution of said radially inner raceway to substantially inhibit friction between the surfaces of said radially inner raceway and bolt in use.

8. In a bolt pointing machine having a spindle, means torque connected to the spindle to rotate said spindle, a slide having non-rotatable bolt holding means on the end thereof in alignment with said spindle, a tool holding head having an outer end having means rigidly mounted on the inner end of the rotating spindle, a hollow center portion having radial tool holding socket means for receiving replaceable pointing tool means projecting inwardly of said hollow center portion having pointing edge means terminating near the center of said head, and an inner hollow bearing holding portion immediately adjacent said tool holding socket means, a radial ball bearing having an inner raceway and an outer raceway surrounding said inner raceway and having its radially outer raceway secured against rotation within said inner bearing containing portion of the head, and means connected to said slide for advancing and retracting said slide, bolt holding means and contained bolt at will, so that the point of the non-rotating bolt is inserted through the orifice in the radially inner raceway to guide the advancing bolt into proper axial alignment with the pointing edge means of the pointing tool means, whereby when the end of the bolt to be pointed contacts the pointing tool means, the radially inner raceway holds the bolt in position substantially without any revolution of said radially inner raceway to substantially inhibit friction between the surfaces of said radially inner raceway and bolt in use.

9. In a bolt pointing machine, a rotatable spindle, means torque connected to the spindle to rotate said spindle, a tool holding head mounted on the inner end of said spindle to rotate therewith having pointing tool means having cutting edge means terminating near the center thereof, a radial anti-friction bearing having an inner raceway and an outer raceway surrounding said inner raceway and carried by said tool holding head immediately inwardly of said pointing tool means to rotate therewith and a substantially non-rotatable bushing carried by the hollow center portion of the radially inner raceway of the anti-friction bearing, an axially movable bolt holder and advancing and retracting mechanism operatively connected to said bolt holder, whereby the point of a bolt secured in said bolt holder is brought adjacent the cutting edge means of the pointing tool means within said tool holder so that said bushing may support the ends of advanced bolts adjacent said cutting edge means, whereby when the end of the bolt to be pointed contacts the pointing tool means, the bushing holds the bolt in position substantially without any revolution of said bushing to substantially inhibit friction between the contacting surfaces of said bolt and bushing in use.

10. In a bolt pointing machine, a rotatable spindle, means torque connected to the spindle to rotate said spindle, a tool holding head mounted on the inner end of said spindle to rotate therewith having pointing tool means having cutting edge means terminating near the center thereof, a radial ball bearing having an inner raceway and an outer raceway surrounding said inner raceway and carried by said tool holding head immediately inwardly of said pointing tool means to rotate therewith and a substantially non-rotatable bushing carried by the hollow center portion of the radial inner raceway of the ball bearing, an axially movable bolt holder and advancing and retracting mechanism operatively connected to said bolt holder, whereby the point of a bolt secured in said bolt holder is brought adjacent the cutting edge means of the pointing tool means within said tool holder so that said bushing may support the ends of advanced bolts adjacent said cutting edge means, whereby when the end of the bolt to be pointed contacts the pointing tool means, the bushing holds the bolt in position substantially without any revolution of said bushing to substantially inhibit friction between the contacting surfaces of said bolt and bushing in use.

11. In a bolt pointing machine, a rotatable spindle, means torque connected to the spindle to rotate said spindle, a tool holding head mounted on the inner end of said spindle to rotate therewith having pointing tool means having cutting edge means terminating near the center thereof, a radial anti-friction bearing having an inner raceway and an outer raceway surrounding said inner raceway and carried by said tool holding head immediately inwardly of said pointing tool means to rotate therewith, an axially movable bolt holder and advancing and retracting mechanism operatively connected to said bolt holder, whereby the point of a bolt secured in said bolt holder is brought adjacent the cutting edge means of the pointing tool means within said tool holder so that the hollow radially inner raceway of said anti-friction bearing may support the ends of advanced bolts adjacent said cutting edge means, whereby when the end of the bolt to be pointed contacts the pointing tool means, the radially inner raceway holds the bolt in position substantially without any revolution of said radially inner raceway to substantially inhibit friction between the contacting surfaces of said bolt and radially inner raceway in use.

12. In a bolt pointing machine, a rotatable spindle, means torque connected to the spindle to rotate said spindle, a tool holding head mounted on the inner end of said spindle to rotate therewith having pointing tool means having cutting edge means terminating near the center thereof, a radial ball bearing having an inner raceway and an outer raceway surrounding said inner raceway and carried by said tool holding head immediately inwardly of said pointing tool means to rotate therewith, an axially movable bolt holder and advancing and retracting mechanism operatively connected to said bolt holder, whereby the point of a bolt secured in said bolt holder is brought adjacent the cutting edge means of the pointing tool means within said tool holder, so that the hollow radially inner raceway of said ball bearing may support the ends of advanced bolts adjacent said cutting edge means, whereby when the end of the bolt to be pointed contacts the pointing tool means, the radially inner raceway holds the bolt in position substantially without any revolution of said radially inner raceway to substantially inhibit friction between the contacting surfaces of said bolt and radially inner raceway in use.

ERNEST GIRARD.

REFERENCES CITED

The following references are of record in the file of this patent:

UNITED STATES PATENTS

| Number | Name | Date |
| --- | --- | --- |
| 495,395 | Grehan | Apr. 11, 1893 |
| 655,095 | Land | July 31, 1900 |
| 1,113,023 | Land | Oct. 6, 1914 |

FOREIGN PATENTS

| Number | Country | Date |
| --- | --- | --- |
| 133,154 | Great Britain | Oct. 3, 1919 |
| 457,843 | Germany | Mar. 27, 1928 |
| 564,708 | Germany | Nov. 22, 1932 |